Feb. 1, 1966 G. A. MANSFIELD, JR., ETAL 3,232,051
DIFFERENTIAL PRESSURE RESPONSIVE DEVICE
Original Filed Dec. 31, 1962 2 Sheets-Sheet 1
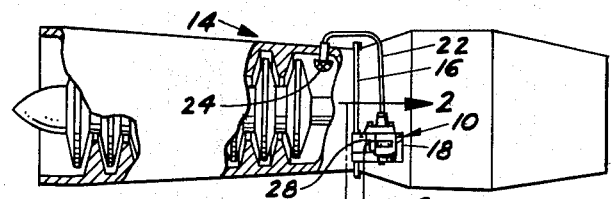
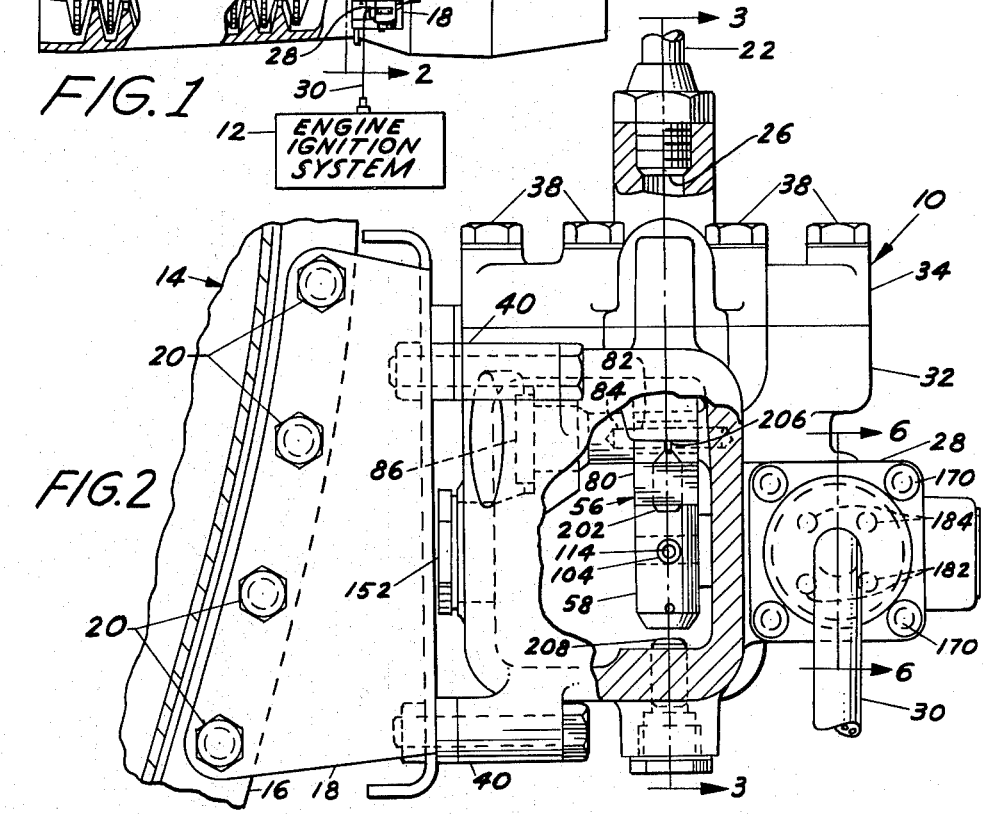
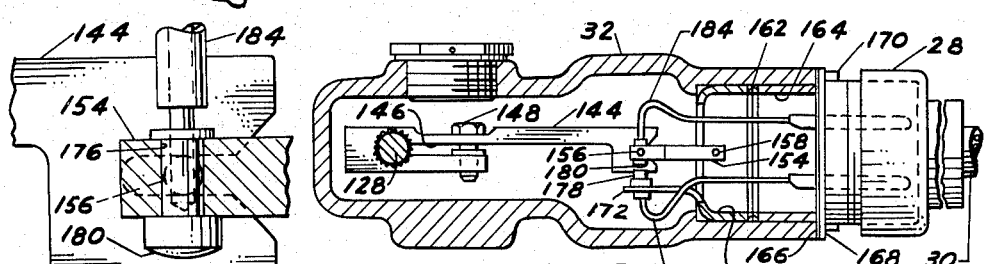
GEORGE A. MANSFIELD, JR.
RALPH P. McCABE
MEHRIN BEGIAN
INVENTORS
BY
ATTORNEY

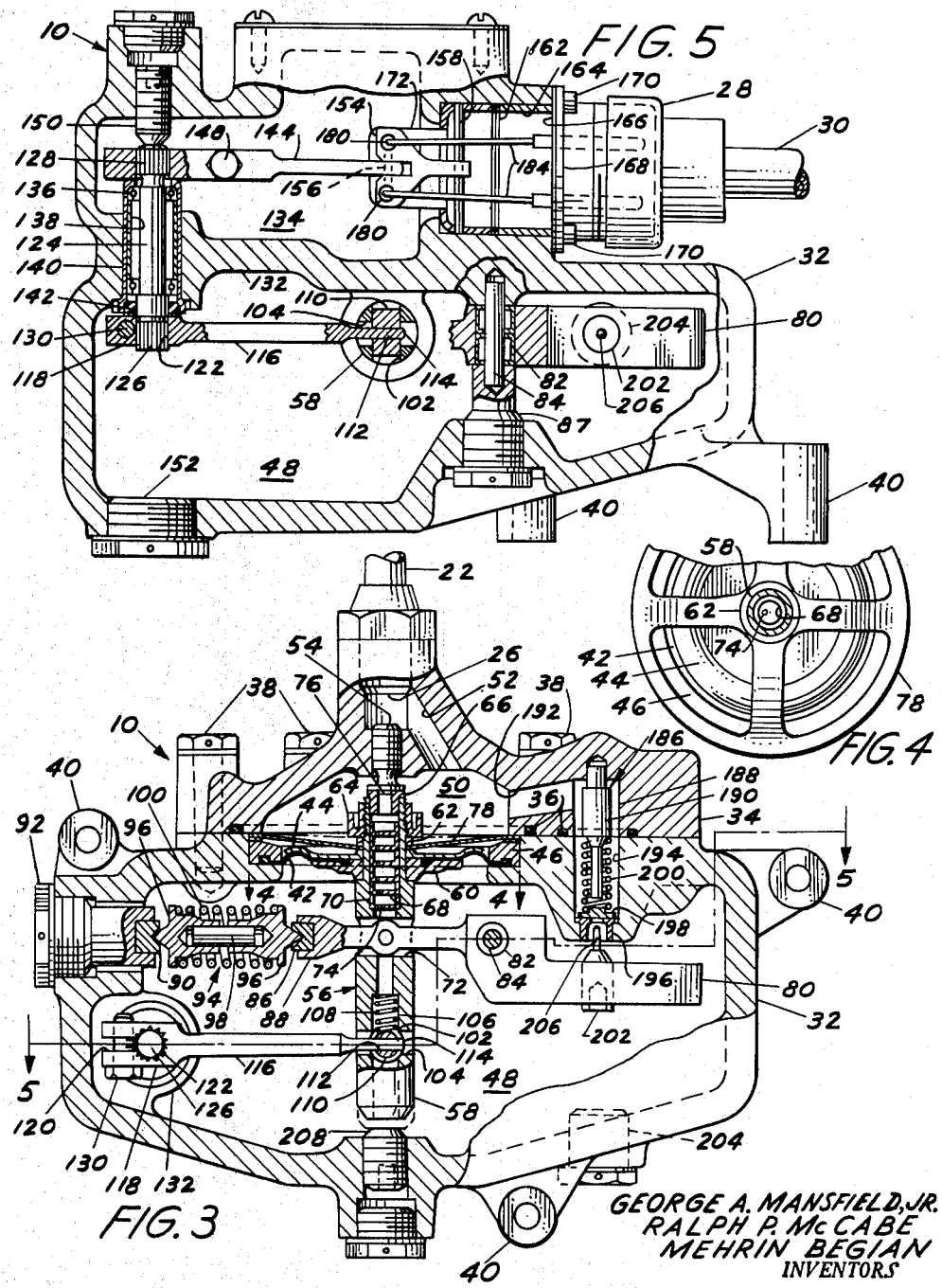

__United States Patent Office__ 3,232,051
Patented Feb. 1, 1966

3,232,051
DIFFERENTIAL PRESSURE RESPONSIVE DEVICE
George A. Mansfield, Jr., South Bend, Ind., and Ralph P. McCabe, Warren, and Mehrin Begian, Detroit, Mich., assignors to Holley Carburetor Company, Warren, Mich., a corporation of Michigan
Original application Dec. 31, 1962, Ser. No. 248,412. Divided and this application June 3, 1964, Ser. No. 387,249
6 Claims. (Cl. 60—39.09)

This application is a division of U.S. application Serial No. 248,412, filed on December 31, 1962, entitled "Differential Pressure Responsive Device."

This invention relates generally to means for detecting flameout and actuating the ignition system in a gas turbine engine, and more specifically to a novel device that is responsive to a pressure differential caused by a particular rate of change of pressure.

It is well known that a simple gas turbine engine flameout, such as may occur in flight due to such things as the entry of water into the air compressor, may be corrected by re-igniting the engine. At the present time, this is done either manually by the pilot or by the use of a continuously operating ignition system. However, these methods are not completely satisfactory, since the former is subject to human error and the latter shortens the life of the engine ignition system.

Accordingly, an object of this invention is to provide a novel, accurate and reliable flameout detecting and ignition system actuating device.

Another object of the invention is to provide such a device that operates in response to changing pressures in the burner chamber such as would occur on flameout.

Still another object of the invention is to provide a device which may have a variety of applications involving a need for a specific type of response to a rate of change in pressure and which may be actuated by mechanical or hydraulic signals, as well as by the pneumatic actuation described in connection with the preferred embodiment of the invention disclosed herein.

Still another object of the invention is to provide such a device which is accurate and reliable, insuring repeatable and positive maintenance-free operation.

Other objects and advantages of the invention will become apparent as the description proceeds, especially when taken in conjunction with the accompanying drawings which illustrate a preferred embodiment of the invention and wherein:

FIGURE 1 is an elevational view in partial cross-section of a gas turbine engine having a device embodying the invention;

FIGURE 2 is an enlarged elevational view in partial cross-section of the device embodying the invention taken on the plane of line 2—2 of FIGURE 1 and looking in the direction of the arrows;

FIGURE 3 is a cross-sectional view taken on the plane of line 3—3 of FIGURE 2 and looking in the direction of the arrows;

FIGURE 4 is an enlarged fragmentary cross-sectional view taken on the plane of line 4—4 of FIGURE 3 and looking in the direction of the arrows;

FIGURE 5 is a cross-sectional view taken on the plane of line 5—5 of FIGURE 3 and looking in the direction of the arrows;

FIGURE 6 is a cross-sectional view taken on the plane of line 6—6 of FIGURE 2 and looking in the direction of the arrows; and FIGURE 7 is an enlarged fragmentary view of a portion of the FIGURE 6 structure.

Referring to the drawings in greater detail, FIGURES 1 and 2 illustrate the detector assembly 10 is adapted to the ignition system 12 of a gas turbine engine 14, the assembly being mounted on a flange 16 on the engine in any suitable manner, such as by a bracket 18 and bolts 20. A conduit 22 communicates either compressor discharge or burner pressure, as sensed by a pressure probe 24 located between the compressor or the burner and an inlet 26 to the detector assembly 10. The detector assembly 10 includes a switch unit 28 which actuates the ignition system 12 through a suitable wire lead 30 in response to an appropriate pressure signal.

As seen in FIGURE 3, the detector assembly 10 comprises a body 32 and a cover 34, separated by seals 36 and held together by bolts 38. Lugs 40 are provided on the body portion 32 for mounting the assembly 10 to the bracket 18. A diaphragm 42, diaphragm shield 44 and diaphragm retainer 46 are confined between the body 32 and cover 34 so as to form chambers 48 and 50 therein. A passage 52 communicates between the inlet 26 and the upper chamber 50.

Threadedly attached to the cover 34 is a link stop screw 54 against which a link assembly 56 at times abuts, as will be described later. The link assembly 56 comprises a link 58, a second diaphragm retainer 60, a shield spacer 62, a nut 64, a yoke stop 66 and a plurality of hold-in jets 68, the latter being confined in an axial passageway 70 in the link 58 by the yoke stop 66. As illustrated in FIGURE 3, the diaphragm 42 and shield 44 surround the link 58 and are fixed for axial movement therewith by the second retainer 60 and the shield spacer 62. The link 58 has a central transverse opening 72 which communicates with the hold-in jets 68, each of which contains a bleed hole 74 and serves as a restriction in the passageway 70. If a single restriction were used in place of the plurality of jets 68, its opening would have to be so small that it could more easily become plugged by tiny particles, hence the series of jets 68, each containing relatively larger openings, is employed. It is to be noted that the yoke stop 66 includes a slot across its face forming an opening 76 which communicates between the axial passageway 70 and the upper chamber 50 when the link assembly 56 is in contact with the link stop screw 54. The link 58 is preferably formed from the same material as body 32 and cover 34 in order to eliminate differential expansion between these parts. The link 58 is caused to move in a true vertical direction and prevented from sideward movement by a link guide 78 (FIGURE 4), which is confined at its outer edge between the diaphragm retainer 46 and the cover 34, and which is preferably formed from a material such as beryllium-copper in order to assure a minimal "springback" tendency.

A counterbalanced lever 80 is pivotally mounted in the transverse opening 72 of the link 58. Bearings 82 fitted into a hole through the lever 80 allow the lever 80 to rotate about a pivot pin 84 which is fixedly mounted between one wall of the body 32 and a plug 37 threadedly attached to the other side of the body 32 (FIGURE 5). A seat 86 is provided at the end 88 of the lever 80 so as to be positioned opposite a second seat 90 provided in the manually adjustable plug 92 which is fixedly attached to the body 32. Confined between the two seats 86 and 90 is an assembly 94 comprising a pair of cones 96, a pin 98 and a spring 100. The cones 96, the pointed ends of which fits into conical depressions in the two seats 86 and 90, are slidably mounted on the ends of the pin 98 and are urged apart by the spring 100. The function of this assembly 94 will be described later.

The link assembly 56 further includes near its lower end second and third transverse openings 102 and 104 perpendicular to one another and a second axial passageway 106 having a detent spring 108 contained therein. A trunnion link 110 is rotatably and loosely confined in the second transverse opening 102. The trunnion link 110 includes a hole 112 through its body perpendicular to its axis. The end 114 of a second lever 116 extends into the third transverse opening 104 in the link 58 and is press fitted into the hole 112 through the trunnion link 110 for movement therewith.

The other end 118 of the lever 116 is slotted inwardly at 120 to a transverse hole 122 which may have a serrated wall surface for a more positive non-slipping connection with a shaft 124 having knurled ends 126 and 128 (FIGURE 5). A screw 130 drawing the split portions together may be employed to assure a good grip of the lever 116 on the knurled end 126 of the shaft 124.

As illustrated in FIGURE 5, the shaft 124 extends through an internal wall 132 in the main body 32 forming a third chamber 134 therein. The shaft 124 is free to revolve in bearings 136, a bearing spacer 138 and bushing 140 fixedly located in the wall 132. A seal 142 confined by the bushing 140 prevents any dirt particles in the accumulator chamber 48 from entering the third chamber 134. An adjustment lever 144 in the third chamber 134 is attached at its one end to the knurled end 128 of the shaft 124 and fastened rigidly thereto by means of a split section 146 and screw 148, as better seen in FIGURE 6. Axial adjustment of the shaft 124 and lateral position of the lever 144 is maintained by a screw 150 threaded in the main body 32. Assembly of the shaft 124 and the two levers 116 and 144 may be facilitated by means of an access opening covered by plug 152.

The other end of the adjusement lever 144 is held in a pivotal relationship with a contact lever 154 by means of a pin 156. While the pin 156 provides a pivotal relationship between the levers 144 and 154, it is connected only to the two levers 144 and 154 and therefore permits their combined vertical movement. The other end of the contact lever 154 also pivots about a second pin 158 but is restrained from vertical movement by virtue of the second pin 158 being fixedly attached to a contact retainer cup 160 (FIGURE 5). The lateral location of the retainer cup 160 may be adjusted by shims 162 and spacer 164 confined in the third chamber 134 by a gasket 166 and cover plate 168 fastened to the body 32 in any suitable manner, such as by bolts 170.

Referring now to FIGURES 6 and 7, the retainer cup 160 is seen to include a punched-out portion 172 having two holes 174 therethrough in alignment with two holes 176 through the contact lever 154. Fastened through these four holes 174 and 176 are two pairs of contacts 178 and 180 facing and normally spaced apart from each other. However, the pairs of contacts 178 and 180 will at times contact each other by virtue of the above mentioned vertical movement of the levers 144 and 154 and their common pivot pin 156.

Leading from the contacts 178 and 180 are two pairs of wire leads 182 and 184 which are attached in some suitable manner to the hermetically sealed electrical connector 28. The latter is connected to the engine ignition system 12 by the wire lead 30 shown in FIGURE 1.

A servo valve assembly 186 is incorporated in the system (FIGURE 3) between the upper and lower chambers 50 and 48 for a purpose which will be described later. The cover 34 contains a drilled hole 188 into which a servo spring seat 190 is pressed. A passageway 192 communicates between the upper chamber 50 and the drilled hole 188. A second drilled hole 194 in the main body 32 is aligned with the upper drilled hole 188 and contains a valve seat 196 at the bottom thereof. A servo valve 198 is normally biased against the valve seat 196 by a spring 200 which is confined between the servo valve 198 and the servo spring seat 190. The counterbalanced lever 80 contains a set screw 202 located directly beneath the servo valve 198. The set screw 202 is adjustable through a normally plugged hole 204 in the main body 32. A needle 206 extends upwardly from the set screw 202 so as to be able at times to lift the servo valve 198 off the valve seat, 196, compressing the spring 200. The unseating of valve 198 would occur only after a predetermined counter clockwise movement by the counterbalanced lever 80 about the pivot pin 84.

Operation

While the above described device may have a variety of applications, its operation will now be discussed in conjunction with the ignition system of a gas turbine engine.

It may be helpful for a better overall understanding of the invention to first describe its operation generally. Because of its restricted communication with chamber 50, chamber 48 serves as a type of accumulator and maintains a pressure that is substantially equal to steady state compressor discharge or burner pressure, depending upon where the pressure probe 24 is located.

In addition to the chamber 48 serving as an accumulator, it also houses a novel toggle assembly 94 which serves to maintain the link assembly 56 against the bottom stop 208 so long as the pressure in chamber 50 does not drop below the pressure in chamber 48 a predetermined amount. That is, the toggle assembly 94 serves to hold the link assembly 56 against stop 208, regardless of the rate of change in pressure at probe 24 and regardless of the magnitude of the pressure in either chamber, so long as the critical pressure differential between these chambers is not exceeded. However, whenever the rate of decrease of pressure in chamber 50 is such that the previous differential between the two chambers exceeds a particular critical value, the toggle assembly 94, having the snapaction effect of a negative spring modulus, will acceleate the link assembly 56 upwardly. This novel acceleration characteristic will be explained more fully in the discussion which follows later.

This upward movement of the link assembly 56 effects the opening of the contacts 178 and 180 so that, in the case of a gas turbine engine application, the current flow from the alternator of the ignition system 12 would be diverted from the switch 28 to the igniter plugs of the engine for the reignition thereof. While ignition systems heretofore used mere continuously operating, the invention causes the igniting of the plugs to continue only until the engine has ignited and the pressure in chamber 50 once again builds up to the extent that the pressure differential between chambers 48 and 50 is below the critical value, at which time the novel toggle assembly 94 moves the link assembly 56 downwardly until the latter abuts once again against the bottom stop 208. This, of course, recloses the contacts 178 and 180.

The complete operation will now be explained in detail. In this connection, it will be apparent that the accumulator pressure, hereinafter referred to as $P_1$, in the lower chamber 48 would be substantially equal to a compressor discharge or burner pressure at probe 24, hereinafter referred to as $P_2$, so long as the engine 14 is operating normally. Under this condition, the link 58 would be seated against the stop 208 at the bottom of the main body 32, the yoke stop 66 at the top of the link assembly 56 would be positioned away from the link stop screw 54 and the lever 116 would have been rotated downwardly, revolving the connector shaft 124. This, in turn, would have rotated the adjustment lever 144 and the attached contact lever 154 downwardly in the third chamber 134 so as to close the pair of movable contacts 180 against the other stationary pair of contacts 178 mounted on the extension 172 of the contact retainer cup 160, it being remembered that closing the contacts 178 and 180 blocks the flow of current to the igniter plugs. Furthermore, the link 58 would have pulled the counter-balanced lever 80 downwardly about the pivot pin 84, thereby forming an angular relationship between the axis of the lever 80 and the axis of the toggle assembly 94, for a purpose which will be described later.

In the above described condition of the device 10, the needle 206 extending from the set screw 202, which is threadedly attached to the counter-balanced lever 80, will have unseated the valve 198, as described above.

The function of the detent spring 108 located in the passageway 106 near the bottom of the link 58 should now be noted. The system is designed so that once the pairs of contacts 178 and 180 come into contact with each other, the link 58 will be some predetermined distance, say .040 inch, from the bottom stop 208. The adjustment lever 144 in the third chamber 134 and the associated lever 116 in the second chamber 48 will have reached the limit of their downward movement by virtue of the contacts 180 having become stopped against the stationary contacts 178. Further downward movement of the link 58 will thus cause the detent spring 108 to become compressed by the now stationary trunnion link 110 at the end of the lever 116. It can thus be seen that the link assembly 56 would likewise have to be moved upwardly about .040 inch before any upward movement of the trunnion link 110 and the lever 116 begins. This is possible by virtue of the clearance between the trunnion link 110 and the transverse opening 102 through the link 58. This technique is employed in order that the contacts 178 and 180 may be instantly opened, thereby helping to prevent the possibility of arcing.

If a normally open design were desired, i.e. having the contacts 178 and 180 open while the link assembly 58 is in its lowermost position and closed when the link assembly 58 accelerates upwardly, it would merely be necessary to (1) place the detent spring 108 below the trunnion link 110, retained by a suitable seat, (2) change the position of the contact retainer cup 160 by rotating it 180°, and (3) reverse the position of the lever 144 on the knurled end 128 of the shaft 124.

The function of the novel toggle spring assembly 94 will now be described. So long as normal operation of the engine prevails, the axes of both the toggle spring assembly 94 and the counter-balanced lever 80 (see FIG. 3) will be positioned below the horizontal some predetermined amount, say 5.8 degrees. The vector forces while the parts are in this relationship would be such that a downward force would prevail at the point of contact between the points of the right end cone 96 and the bottom of the conical wide-angle depression in the seat 86 at the end 88 of the counter-balanced lever 80. The effect could be likened to a "negative rate" spring, similar in function to a conventional snap-action spring, requiring a particular force to actuate any movement thereof. Once this predetermined force is reached and upward movement of the cone 96 and seat 86 begins, a progressively lower force would be required as the angular relationship with horizontal decreases. It is in this manner that acceleration is produced once movement begins. The movement of the toggle system 94 and the lever 80 continues until the yoke stop 66 abuts against the link stop screw 54, at which time the angular relationship of the toggle spring 100 and lever 80 axes with horizontal is approximately .5 degree, but still below the horizontal.

It should be understood that the device 10 is designed such that so long as a low, normal engine operation decay rate of $P_2$ occurs, the flow from the lower accumulator chamber 48 past the valve 198, into the valve chambers 194 and 188 and out through the conduit 192 to the upper chamber 50 would be such that the $P_1-P_2$ differential (5 p.s.i., for example) acting on the area of diaphragm 42 would provide a force less than the force required to initiate upward movement of the toggle assembly 94 and lever 80. However, in the event of an engine flameout, a rapid $P_2$ decay rate as high as 1500 p.s.i. per second could occur. Under such a circumstance, the flow from the accumulator chamber 48 to the upper chamber 50 through the passages just described would be too slow, and the $P_1-P_2$ differential across the diaphragm 42 would be sufficient to initiate the upward movement of the toggle assembly 94 and shaft 80. Then, as was described above, upward acceleration of the toggle assembly 94 and shaft 80 would continue until the link 58 were to come into c... screw 54.

It can now be seen that the link a... have been travelling at a relatively high sp... the previously described .040" compression o... spring 108 is eliminated, thereby causing the co... and 180 to be snapped quickly apart by virtue of the upward movement of the lever 116. This, of cou... reduces the possibility of arcing.

So long as the contacts 178 and 180 remain closed, there would be a continuous current flow from the alternator of the ignition system 12 through the hermetically sealed connector switch 28 and back to the alternator. However, once the contacts 178 and 180 open, such as would result from the upward movement of the link assembly 56 in the event of a flameout as described above, the current flow from the alternator would then be diverted to the igniter plugs of the engine 14 for the reignition thereof.

At the same time that the ignition is actuated following a flameout, the valve 198 closes against the seat 196, as was described above, and the timed ignition hold-in system becomes effective. This hold-in system comprises a series of hold-in jets 68 and a yoke stop 66 inserted in the axial passage 70 in the link assembly 56. The operation of the timed ignition hold-in system will now be described.

While the yoke stop 66 is abutted against the link stop screw 54, air flow will occur between the lower and upper chambers 48 and 50 by way of the transverse opening 72 in the link 58 and the holes 74 through the series of hold-in jets 68, and thence through the center of the yoke stop 66 and out through the slotted opening 76 in the top of the yoke stop 66 into the upper chamber 50. This greatly reduced air flow allows $P_1-P_2$ to gradually decrease until such time as the $P_2$ decay settles out after which $P_1$ gradually approaches $P_2$. Regardless of the magnitude of either pressure, when $P_1-P_2$ is reduced below the critical value, the downward component force in the toggle spring 100 and lever 80, which are at rest some amount, say .5 degree, from horizontal, will be greater than the now decreased upward force on the diaphragm 42, and the toggle system 94 and lever 80 will move downwardly. Movement of the lever 80 about the pivot pin 84 will, in turn, move the link assembly 56 downwardly toward the bottom stop 208, resulting in the closing of the contacts 180 against the stationary contacts 178 and the opening of valve 198.

Hold-in time can be modified by changing the size of the openings 74 in the hold-in jets 68, or by adjusting the position of yoke stop 66.

In summary, it can be seen that the invention eliminates the need for continuous ignition, thereby lengthening ignition system life. Automatic operation eliminates the need for pilot concern about reignition after a flameabout.

While applicants' device forms the intended function in direct response to a pressure differential exceeding a critical value, it can also be said that the device is responsive to the rate of change of a pressure being sensed. Thus, it can be seen that the invention, or some modification thereof, may be employed wherever it is desired to sense the rate of change of some pressure and to actuate some external device accordingly. For example, it is possible that a valve or other system could be substituted for the switch 28.

While only one embodiment of the invention has been disclosed and described, it is apparent that other modifications of the invention are possible within the scope of the appended claims.

What we claim as our invention is:

1. A device for detecting flame-out in and energizing the ignition system of a gas turbine engine having a burner chamber, said device comprising a body having a first chamber to which pressure indicative of engine burner pressure is continuously communicated, a second chamber, ...eans
...ment
...except
...esulting
...id mov-
...between said
...ent of said predetermined
...rapid decrease in pres-
...ting from an engine ...ing a burner chamber
...nsive to a decrease in
...nd magnitude result-
ing from engine... ...ically operating said
ignition system either... ...rmined time period
or until said engine is reignit... said time period.

3. In a gas turbine engine having a burner chamber and an ignition system, means responsive to a decrease in burner chamber pressure of the rate and magnitude resulting from engine flameout for automatically operating said ignition system and means for automatically rendering said ignition system inoperative when said engine is reignited.

4. In a gas turbine engine having a chamber in which the pressure drops drastically on engine flameout and an ignition system, means for maintaining said ignition system inoperative during normal engine operation, means responsive to the pressure drop in said chamber of the rate and magnitude occurring on flameout for automatically operating said ignition system and means responsive to a subsequent increase in pressure in said chamber upon reignition of said engine for again automatically rendering and maintaining said ignition system inoperative.

5. A device for detecting flameout in and energizing the ignition system of a gas turbine engine, said device comprising a body having a first chamber to which engine operating pressure is continuously communicated, a second chamber, a common movable wall between said chambers, means associated with said movable wall for preventing the movement of said movable wall toward said first chamber except upon a decrease in pressure in said first chamber resulting in a predeterming pressure differential across said movable wall, and a restricted communication between said chambers preventing the attainment of said predetermined pressure differential except upon a rapid decrease in pressure in said first chamber resulting from an engine flameout.

6. In a gas turbine engine having an ignition system, means responsive to a decrease in engine operating pressure of the rate and magnitude resulting from engine flameout for automatically operating said ignition system either for a predetermined time period or until said engine is re-ignited within said time period.

References Cited by the Examiner

UNITED STATES PATENTS 2,959,007   11/1960   Gregory et al. _____ 60—39.82

FOREIGN PATENTS 660,178   10/1948   Great Britain.

MARK NEWMAN, *Primary Examiner.*

SAMUEL LEVINE, *Examiner.*